(12) United States Patent
Gao

(10) Patent No.: US 12,146,980 B2
(45) Date of Patent: Nov. 19, 2024

(54) PARAMETER DEFINED STEPPED FREQUENCY WAVEFORM FOR RADAR

(71) Applicant: Aptiv Technologies AG, Schaffhausen (CH)

(72) Inventor: Boyi Gao, Westfield, IN (US)

(73) Assignee: Aptiv Technologies AG, Schaffhausen (CH)

( * ) Notice: Subject to any disclaimer, the term of this patent is extended or adjusted under 35 U.S.C. 154(b) by 380 days.

(21) Appl. No.: 17/645,720

(22) Filed: Dec. 22, 2021

(65) Prior Publication Data

US 2023/0194657 A1 Jun. 22, 2023

(51) Int. Cl.
| | |
|---|---|
| *G01S 7/32* | (2006.01) |
| *G01S 7/282* | (2006.01) |
| *G01S 7/295* | (2006.01) |
| *G01S 13/72* | (2006.01) |
| *G01S 13/931* | (2020.01) |

(52) U.S. Cl.
CPC .............. *G01S 7/32* (2013.01); *G01S 7/282* (2013.01); *G01S 7/2955* (2013.01); *G01S 13/723* (2013.01); *G01S 13/931* (2013.01)

(58) Field of Classification Search
CPC .......... G01S 7/32; G01S 7/282; G01S 7/2955; G01S 13/723; G01S 13/931
See application file for complete search history.

(56) References Cited

U.S. PATENT DOCUMENTS

| | | | | |
|---|---|---|---|---|
| 5,191,337 A | * | 3/1993 | Brovko | G01S 13/34 |
| | | | | 342/160 |
| 6,603,424 B1 | * | 8/2003 | Abatzoglou | G01S 13/904 |
| | | | | 342/25 R |

(Continued)

FOREIGN PATENT DOCUMENTS

| | | | | |
|---|---|---|---|---|
| CN | 108398676 A | * | 8/2018 | ............. G01S 13/56 |
| CN | 113204018 A | * | 8/2021 | ........... G01S 13/341 |

(Continued)

OTHER PUBLICATIONS

"Extended European Search Report", EP Application No. 22202885. 4, May 11, 2023, 11 pages.

*Primary Examiner* — Vladimir Magloire
*Assistant Examiner* — Maxine McKenzie Phillips
(74) *Attorney, Agent, or Firm* — Harness, Dickey & Pierce, P.L.C.

(57) ABSTRACT

This document describes techniques, apparatuses, and systems for a parameter defined stepped frequency waveform for a radar system. A radar system transmits radar transmit signals including a parameter defined stepped frequency waveform with a specific change in frequency between chirps. The specified change in frequency may increase the signal to noise ratio of radar receive signals reflected off an object in the field of view. The radar receive signals may then be transformed into the frequency domain to determine a range and range rate of the object in the field of view. The range and range rate determined from the representation of the radar receive signals in the frequency domain may be output to a radar tracker to enable tracking of the object in the field of view. In doing so, accurate radar tracks may be generated that robustly track objects in the field of view of the radar system.

22 Claims, 7 Drawing Sheets

(56) References Cited

U.S. PATENT DOCUMENTS

| | | | |
|---|---|---|---|
| 6,965,341 B1* | 11/2005 | Cho | G01S 13/24 |
| | | | 342/25 R |
| 2019/0317205 A1* | 10/2019 | Meissner | H03M 7/3059 |
| 2020/0033442 A1* | 1/2020 | Gulati | H04K 1/00 |
| 2021/0156981 A1 | 5/2021 | Stettiner et al. | |
| 2021/0333386 A1 | 10/2021 | Park et al. | |
| 2021/0341576 A1* | 11/2021 | Marcus | G01S 17/10 |

FOREIGN PATENT DOCUMENTS

| | | | | |
|---|---|---|---|---|
| EP | 3796038 A1 | 3/2021 | | |
| JP | 2020016639 A * | 1/2020 | | G01S 13/24 |
| WO | WO-2019215734 A1 * | 11/2019 | | G01S 13/343 |
| WO | WO-2021034333 A1 * | 2/2021 | | A61B 5/0002 |

* cited by examiner

PARAMETER DEFINED STEPPED FREQUENCY WAVEFORM FOR RADAR

BACKGROUND

Radar systems are commonly used as part of perception systems of autonomous vehicles to operate a vehicle or at least assist in driving operations. Typically, radar systems receive signals reflected off of objects in a field of view and process the signals into useful information about relative position and velocity to enable tracking of the objects, even as the vehicle based radar and/or the object move. When a range from the vehicle to the object changes frequently and/or by large amounts, noise in reflecting signals may introduce errors into object measurements (e.g., position, direction, and/or speed) output in object tracks. Inaccurate radar tracking, especially in dynamic-everyday driving situations, can cause unsafe and/or uncomfortable driving behavior.

SUMMARY

This document describes techniques, apparatuses, and systems for a parameter defined stepped frequency waveform for radar. A radar system transmits radar signals including a parameter defined stepped frequency waveform. A parameter of the radar system specifies a change in frequency between chirps. The specified change in frequency may increase the signal to noise ratio of radar receive signals that reflect off an object in the field of view. The radar receive signals can be transformed into a frequency domain to determine a range and range rate of the object in the field of view. The frequency domain-based range and range rate determination is more accurate than deducing the range and the range rate in other ways, such as using other stepped waveforms. The range and range rate determined in the frequency domain may be output to a radar tracker to enable high accurate tracking of the object in the field of view. In doing so, accurate radar tracks may be generated for a vehicle to operate safely, despite frequent or dramatic changes in another object's relative positions.

In aspects, a method is disclosed that includes transmitting radar transmit signals representing a parameter defined stepped frequency waveform comprising a frame of chirps. The change in pulse between an initial chirp and a current chirp may be defined based on a starting frequency of the initial chirp, a slope of the initial chirp, an index of the current chirp, and a pulse repetition period of the initial chirp. The method may also include receiving radar signals representing the parameter defined stepped frequency waveform reflected off of an object in the field of view of the radar system and performing a transformation of the radar receive signals to determine a representation of the radar receive signals in the frequency domain. A range and a range rate associated with the object in the field of view may then be determined based on the representation of the radar receive signals in the frequency domain and the range and range rate may be output to a radar tracker to enable radar tracking of the object in the field of view.

In some implementations, performing a transformation of the radar receive signals to determine the representation of the radar receive signals in the frequency domain includes performing a two-dimensional Fourier transform of the radar receive signals to generate a two-dimensional representation of the radar receive signals in the frequency domain. In aspects, the two-dimensional representation includes a fast-time dimension and a slow-time dimension. In some implementations determining the range and the range rate associated with the object in the field of view based on the representation of the radar receive signals in the frequency domain includes determining a peak of the two-dimensional representation of the radar receive signals and determining the range and the range rate corresponding to the peak of the two-dimensional representation of the radar receive signals. In aspects, determining the range and range rate corresponding to the peak of the two-dimensional representation of the radar receive signals comprises determining a fast-time frequency and a slow-time frequency associated with the peak of the two-dimensional representation of the radar receive signals and determining the range and range rate associated with the peak of the fast-time frequency and the slow-time frequency.

In some implementations, performing the transformation of the radar receive signals to determine the representation of the radar receive signals in the frequency domain further comprises compensating for a phase contribution of the radar receive signals in the slow-time dimension based on range values of the two-dimensional representation of the radar receive signals. In aspects, determining a range and a range rate associated with the object in the field of view based on the representation of the radar receive signals in the frequency domain comprises neglecting second order terms.

In some implementations, the methods are performed by a system including a radar system, at least one processor, and at least one computer-readable storage media. In aspects, the computer-readable storage media includes machine-readable instructions that, when executed by the at least one processor, cause the at least one processor to perform the methods disclosed. In some implementations, the system includes a radar system for a vehicle. In aspects, the system outputs the range and range rate to a radar tracker that performs radar tracking to assist in performance of a vehicle function. In some implementations, the operations described are performed over multiple processors. For example, portions of the described techniques may be performed on a single processor, while others are performed on a separate processor. Additionally, the processors, computer-readable storage media, vehicle subsystems, radar system components, and the like may communicate via a data bus. In some implementations, portions of parameter defined stepped frequency waveform for a radar system are performed by a waveform generator or a radar processing component. The waveform generator or the radar processing component may include hardware, software, or firmware configured to perform the techniques described above.

This Summary introduces simplified concepts related to movement compensated two-dimensional signal processing for a radar system further described in the Detailed Description and Drawings. This Summary is not intended to identify essential features of the claimed subject matter, nor is it intended for use in determining the scope of the claimed subject matter.

BRIEF DESCRIPTION OF THE DRAWINGS

The details of one or more aspects of a parameter defined stepped frequency waveform for a radar system are described in this document with reference to the following figures. The same numbers are often used throughout the drawings to reference like features and components.

DETAILED DESCRIPTION

Introduction

Figure 1:
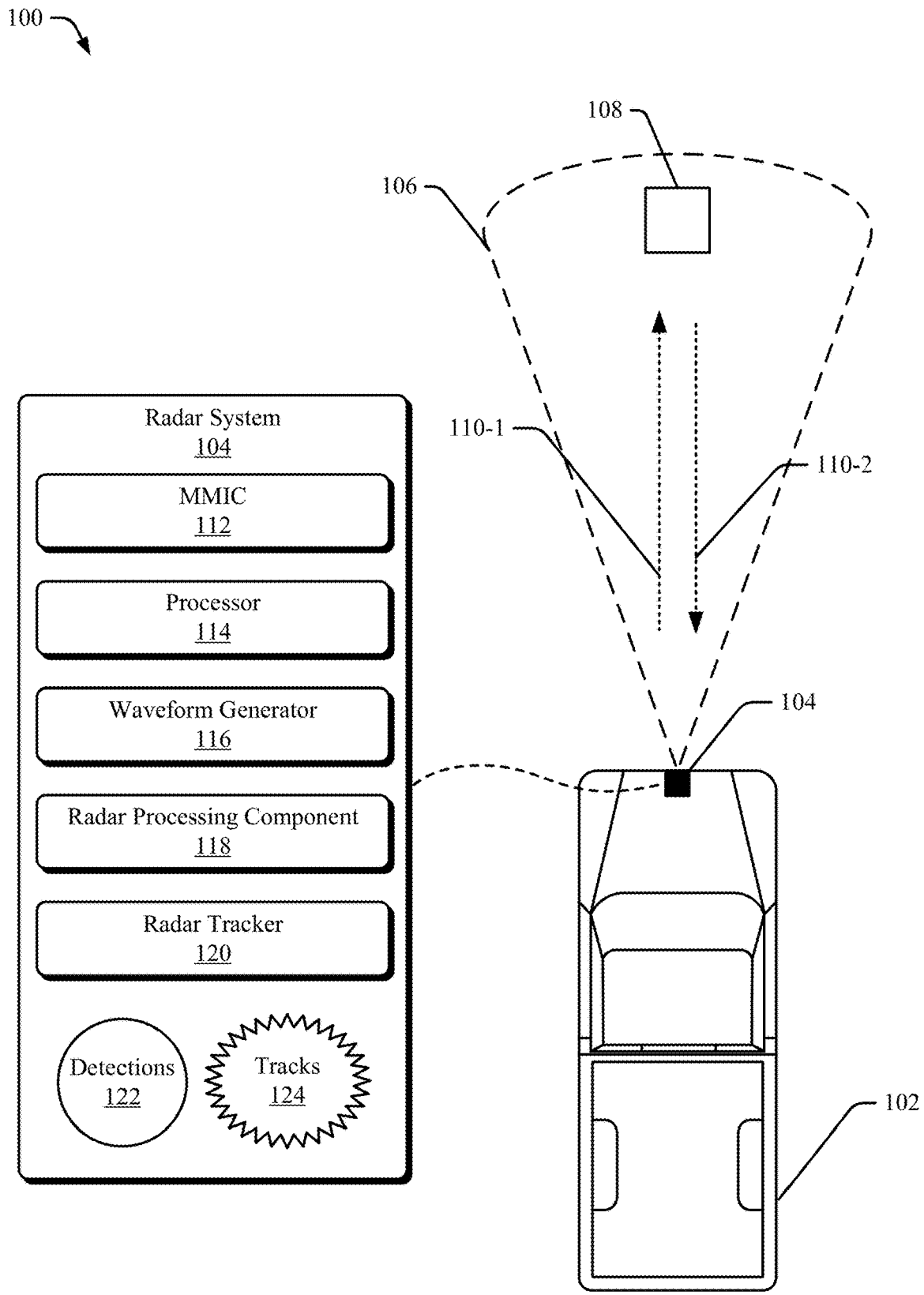
FIG. 1 illustrates an example environment for a parameter defined stepped frequency waveform for a radar system.

A perception system may rely on a radar tracker to provide situational awareness and detect objects of interest in an environment of a vehicle. The radar system includes a transmit-receive antenna array, for example, a multiple input multiple output (MIMO) antenna array, and a MIMO-integrated-circuit (MMIC), which obtains multiple chirps of radar returns reflecting from objects over multiple frames (of time). From radar data output by the MMIC, a radar processor can transform the radar data into the frequency domain through a two-dimensional Fourier Transform, for example, a Discrete Fourier Transform (DFT) or a Fast Fourier Transform (FFT) In the frequency domain, the radar signals may be represented in terms of a fast-time dimension (e.g., samples collected over a single chirp) and a slow-time dimension (e.g., samples collected across multiple chirps). When the received signals are transformed into the frequency domain, the received energy from radar signal reflections may be better grouped to identify energy peaks within the two-dimensional FFT. Detections may be determined from an energy peak of the radar signals reflected off of an object in the field of view of the radar system. Detections may include data, such as range and range rate, determined through a set of linear equations and associated with a radar-reflective portion of an object over a specific time. Certain terms in the phase response of the radar receive signals, however, may cause increased noise in the frequency domain and contribute to error in the calculations of range and range rate or cause failures to detect the object in the field of view altogether. As a result, the radar tracks generated from the noisy phase response may be imprecise and cause inaccurate or incomplete driving tracks.

A radar tracker can deduce object measurements (object position, size, orientation, velocity, and acceleration) based on detections to small parts of each object in the scene. Some detections (e.g., deemed to be noise) may be discarded to reduce the amount of radar data ultimately being processed. Detections may be discarded by applying thresholding and/or by applying non-maximal suppression of the energy attributed to the detections, for example by peak finding in frequency domain. As a result, the radar tracker may produce tracks that contain measurements associated with an object in the field of view that reflects radar receive signals. However, if the data (e.g., range and range rate) associated with detections are inaccurate or missing entirely, the radar tracker may produce inaccurate radar tracks that, when relied upon to perform vehicle functions, may cause unsafe, uncomfortable, or erratic driving behaviors.

Overview

This document describes techniques, apparatuses, and systems for a parameter defined stepped frequency waveform for radar. An example radar system generates and transmits radar transmit signals, including a predetermined stepped frequency waveform. The radar transmit signals are transmitted in a field of view of the radar system and radar receive signals are received through a receiver of the radar system. The radar receive signals may be used to generate a two-dimensional representation (e.g., fast-time dimension and slow-time dimension) of the received radar signals in the frequency domain. In some examples, the use of the parameter defined stepped frequency waveform creates a need to compensate the slow-time dimension based on range values of the two-dimensional representation. Once created, the two-dimensional representation of the received radar signals may be searched for an energy peak (e.g., a point on the two-dimensional representation which meets certain criteria). Due to the use of the parameter defined stepped frequency waveform, the energy peak may possess a greater signal to noise ratio due to the cancellation of terms in the phase response of the radar receive signals.

Once an energy peak has been determined in the two-dimensional representation, data associated with the energy peak may be derived. For example, range and range rate may be determined through use of a set of linear equations relating a frequency in the fast-time dimension and a frequency in the slow-time dimension. The use of the parameter defined stepped frequency waveform may allow for a more accurate range and range rate to be determined from detections to an object in the field of view. As a result, a more accurate radar track may be determined by a radar tracker utilizing a more accurate object position, object direction, and/or object speed. In some implementations, a range and range rate, may be output to a vehicle subsystem to perform a vehicle function. In some implementations, the range and range rate are used to generate tracks that are utilized by an advanced driver-assistance system to detect and avoid objects. In this manner, the techniques, apparatuses, and systems described herein may provide safe, comfortable, and convenient operation of an autonomous vehicle.

Example Environment

FIG. 1 illustrates an example environment 100 for a stepped frequency waveform for a radar system. In the depicted environment 100, a vehicle 102 travels on a roadway. Although illustrated as a passenger truck, the vehicle 102 can represent other types of motorized vehicles (e.g., a car, motorcycle, bus, tractor, semi-trailer truck), non-motorized vehicles (e.g., a bicycle), railed vehicles (e.g., a train), watercraft (e.g., a boat), aircraft (e.g., an airplane), spacecraft (e.g., satellite), and the like. The vehicle 102 relies on a perception system, including a radar system 104, for avoiding objects while driving among other objects that may appear in the environment 100.

The radar system 104 outputs radar data, including indications of objects detected in a field of view 106. For example, the radar data may alert advanced safety or autonomous driving systems of the vehicle 102 about objects (e.g., an object 108) that appear near the vehicle 102. The radar system 104 can be installed on, mounted to, or integrated with any part of the vehicle 102, such as in a front, back, top, bottom, or side portion of the vehicle 102, a bumper, a side mirror, part of a headlight and/or tail light, or at any other interior or exterior location of the vehicle 102 where object detection using radar is desired. The radar system 104 may include multiple radar devices or multiple radar systems that coordinate to provide the field-of-view 106.

The radar system 104 can include a combination of hardware components and software components executing thereon. For example, a computer-readable storage media (CRM) of the radar system 104 may store machine-executable instructions that, when executed by a processor, cause the radar system 104 to output information about objects detected in the field of view 106. One example combination of hardware and software components of the radar system 104 includes a MMIC 112, at least one processor 114, a waveform generator 116, a radar processing component 118, and a radar tracker 120.

With inclusion of the MMIC 112, the radar system 104 is shown as a MIMO radar system, however the radar tracking techniques described herein are not necessarily limited only to MIMO radar systems and can be applied for radar tracking in other radar types of radar systems. For simplicity of the Drawings, an antenna is not shown, however, the MMIC 112 includes an interface to an appropriate antenna, such as a MIMO antenna array. During each frame of time, the MMIC 112 transmits radar signals 110-1 via the antenna to radiate objects in the field of view 106. The MMIC 112 receives radar returns 110-2 via the antenna as reflected versions of the radar signals 110-1 transmitted for that frame. The MMIC 112 transforms the radar returns 110-2 into a digital format enabling the radar system 104 to quickly establish tracks to objects in the field of view 106.

The processor 114 and the waveform generator 116 are configured to generate a waveform for the transmitting radar signals 110-1. In aspects, the waveform generator 116 generates a stepped frequency waveform based on a predetermined set of parameters. In doing so, the signal-to-noise ratio of the received radar returns 110-2 in the frequency spectrum may allow for more accurate radar detection. The waveform generator 116 may contain computer-readable instruction that, when executed by the processor 114, cause the processor 114 to operate in communication with the MMIC 112. For example, the processor 114 may execute the waveform generator 116 to determine an ideal waveform based on the defined parameters and provide the ideal waveform to the MMIC 112. The MMIC 112 may perform modulation, multiplexing, or any other signal operation. While the above process is described as executing on the processor 114 through execution of the waveform generator 116, it should be appreciated that the waveform generator 116 may be implemented through any combination of hardware, software, or firmware.

The processor 114, the radar processing component 118, and the radar tracker 120 are configured to process the radar returns 110-2 digitized by the MMIC 112 into various forms of other radar data, some of which is maintained for internal use by the radar system 104, such as a set of detections 122. Other forms of radar data are generated for use by other systems of the vehicle 102 (outside the radar system 104), such as a set of tracks 124 corresponding to objects tracked from the radar returns 110-2 for the field of view 106.

The processor 114 generates a two-dimensional representation of the received radar signals, which is indicative of a collection of measurements related to the digitized radar returns 110-2 obtained from the MIMIC 112 during one or more frame. In some implementations, the two-dimensional representation may be adjusted for phase contribution due to range in the slow-time dimension. Based on the two-dimensional representation of the digitized radar returns 110-2 obtained from the MIMIC 112, the processor 114 may perform peak finding. The radar processing component 118 may utilize the found peaks to generate the detections 122. A single detection or group of the detections 122 can indicate a range and radial range rate to effective radar returns 110-2 (scatters) on the object 108 in the environment 100. The detections 122 may have errors in position (e.g., azimuth angle), however, many of the detections 122, with accurate and high-quality range and range rates, can be used to support augmentation of the tracks 124. As such, detections 122 that contain more accurate data (e.g., range and range rate) may facilitate more accurate tracks 124.

Radar processing component 118 may analyze and determine data associated with detections. For example, a peak may be found within the two-dimensional representation of the digitized radar returns 110-2. In the frequency domain, peaks may be identified based on their location in the fast-time dimension (e.g., samples collected over a single chirp) and the slow-time dimension (e.g., samples collected over multiple chirps). Based on the identified frequencies in each of the respective domain, a two-dimensional system of equations may be created with respect to range and range rate. The system of equations may be solved by the radar processing component 118, and thus, determine range and range rate data associated with the found peaks. Due to the parameter defined stepped frequency waveform, the two-dimensional representation may have a high signal-to-noise ratio, even at high relative velocities between the radar system 104 and the object 108. As a result, detections 122 may be determined more accurately from the two-dimensional representation and a more accurate range and range rate associated with a peak of the two-dimensional representation may be determined.

Objects may be detected from an analysis of the detections 122. The detections 122 may be resolved into object data that are detection-based on execution of the radar tracker 120. The object data may be maintained internal to the radar system 104 to enable subsequent generation of the tracks 124. The object data are not the same as the tracks 124, which are highly accurate representations of objects augmented by radar detections. Rather, the object data refer to internal representations of objects (or portions of objects) and their respective measurements, which are maintained until they can be used to establish or augment the tracks 124.

The radar tracker 120 may produce the object data derived from the detections 122, e.g., from grouping and analyzing the detections 122 using detection-based object recognition techniques. Some of the detections 122 (e.g., false detections, noise) may be filtered to reduce complexity/the amount of the detections 122 ultimately processed. For example, the detections 122 may be discarded by applying thresholding and/or by applying non-maximal suppression of the energy attributed to the detections, for example, by peak finding in the Range-Doppler plane. By utilizing the parameter defined stepped frequency waveform, thresholding may more accurately filter out false detections, while passing the detections 122.

Example Vehicle Configuration

Figure 2:
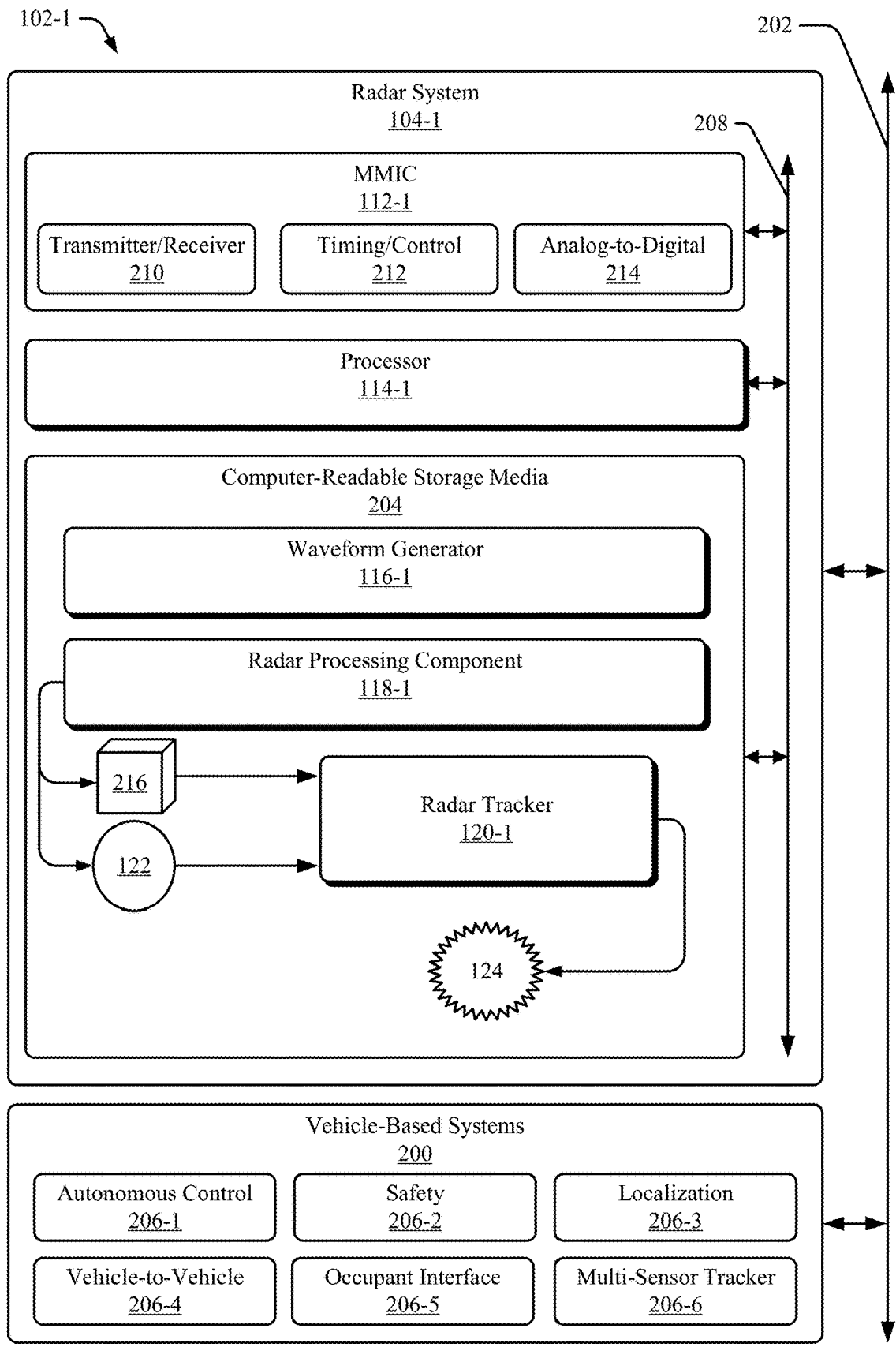
FIG. 2 illustrates an example vehicle including a system configured to utilize a parameter defined stepped frequency waveform for a radar system.

FIG. 2 illustrates an example vehicle 102-1 including a system configured to utilize a stepped frequency waveform for a radar system. The vehicle 102-1 is an example of the vehicle 102. Included in the vehicle 102-1 is a radar system 104-1, which is an example of the radar system 104, shown in greater detail. The vehicle 102-1 includes vehicle-based systems 200 that are operatively and/or communicatively coupled to the radar system 104-1 via link 202, which may be one or more wired and/or wireless links including vehicle-based network communications for interconnecting the components of the vehicle 102-1. In some examples, the link 202 is a vehicle communication bus.

The vehicle-based systems 200 use radar data provided on the link 202 by the radar system 104-1 to perform a particular function. For example, the set of tracks 124 can include information about movement of an object in the field of view, such as a velocity and changes in position of the object 108 to enable the vehicle-based systems 200 to control the vehicle 102-1 to perform emergency braking, perform a lane change, or adjust a vehicle direction and/or speed. In another example, detections 122 alone may be provided to the vehicle-based systems 200 to enable object detection. In an example use, object detection may be usable as a part of the vehicle safety for blind spot monitoring. Examples of the vehicle-based systems 200 include systems for autonomous control 206-1, safety 206-2, localization 206-3, vehicle-to-vehicle 206-4 communication, occupant interface 206-5, and multi-sensor tracker 206-6. Other examples of the vehicle-based systems 200 are conceivable as, including vehicle subsystems (e.g., components, circuits) thereof. The radar data that is output to the vehicle-based systems 200 on the link 202 includes the tracks 124 generated by the radar tracker 120-1 (e.g., an example of radar tracker 120) of the radar system 104-1. The tracks 124 include object-level information corresponding to objects detected in the field-of-view 106, which upon receipt by the vehicle-based systems 200, can enable the vehicle 102-1 to drive safely by avoiding the object 108.

As one example, the autonomous control 206-1 provided by the vehicle-based systems 200 can use the set of tracks 124 received via the link 202 to autonomously or semi-autonomously control the vehicle 102-1 and safely drive on a road. The vehicle-based systems 200 may perform other functions performed in response to the set of tracks 124, which are not necessarily for vehicle control. For instance, the set of tracks 124 can be output to the occupant interface 206-5 to allow the operator or controller to act and avoid the objects. The set of tracks 124 may be provided to other vehicles using the vehicle-to-vehicle 206-4 communication, to allow operators or controllers of the other vehicles to also avoid the objects being tracked or have confidence that the vehicle 102-1 is aware of the presence of the other vehicles. By improving situational awareness, the vehicle 102-1 can drive in a safer manner to avoid the object 108 and other objects in the environment 100.

The radar system 104-1 includes a MMIC 112-1, as an example of the MMIC 112. The MMIC 112-1 includes transmitter/receiver elements 210, timing/control elements 212, and analog-to-digital converters 214. For simplicity in the Drawings, omitted from FIG. 2 is a MIMO antenna array that is also part of the radar system 104-1 and operatively coupled to the transmitter/receiver elements 210.

The transmitter/receiver elements 210 are configured to transmit electromagnetic (EM) signals as radar signals (e.g., the radar signals 110-1) and to receive reflected versions of the EM signals (e.g., the radar returns 110-2). In a MIMO example such as this, the transmitter/receiver elements 210 enable reception of the radar returns with greater resolution than, for example, multistate radar. The transmitter/receiver element 210 includes one or more components for emitting, and one or more components for detecting, the EM signals. The transmitter/receiver elements 210 enable transmission of the radar signals that radiate the field of view, and manage reception of the radar returns, many of which correspond to object reflections of the transmitted radar signals. The transmitter/receiver element 210 can be configured as a transceiver implemented as a single component (e.g., chip) to perform both transmission and reception. Alternatively, the transmitter/receiver element 210 can be implemented as a separate transmitter and a separate receiver.

The timing/control elements 212 perform operations that adjust characteristics of the radar signals (e.g., frequency, gain, phase, period) being transmitted, or operations to capture the radar returns being reflected, in a way that is effective for radar tracking. For example, in accordance with existing MIMO techniques, the timing/control elements 212 cause the transmitter/receiver elements 210 to adjust a size, a shape, antenna pattern, or other characteristic of the radar system 104-1 to transmit the radar signals 110-1 to cause the radar returns 110-2 to capture high-resolution information about the environment 100.

The analogue-to-digital converters 214 convert the radar returns obtained from the transmitter/receiver elements 210 into a digital form that can be used for generating a data cube 216, detections 122, and other radar processing. The MIMIC 112-1 samples the signal at an appropriate sampling rate, for example, at least the Nyquist frequency. The MMIC 112-1 outputs the digitized radar returns over a link 208, which represents an internal communication link between components of the radar system 104-1. The link 208 may be wired or wireless and enables internal representations of radar data to be exchanged within the radar system 104-1 before appearing as the tracks 124 that are output on the link 202.

Operatively coupled to the MMIC 112-1 and the link 208, the radar system 104-1 also includes at least one processor 114-1, which is an example of the processor 114. Some examples of the processor 114-1 include, a controller, a control circuit, a microprocessor, a chip, a system, a system-on-chip (SoC), a device, a processing unit, a digital signal processing unit, a graphics processing unit, and a central processing unit. The processor 114-1 can be any component configured to process frames of digitized radar returns obtained from the MIMIC 112-1 to convey objects in the field of view based on information appearing in the tracks 124. The processor 114-1 may include multiple processors, one or more cores, embedded memory storing software or firmware, a cache or any other computer element that enables the processor 114-1 to execute machine-readable instructions for generating the tracks 124.

The machine-readable instructions that are executed by the processor 114-1 can be stored by a computer-readable media (CRM 204) of the radar system 104-1. The CRM 204 may also be used to store data managed by the processor 114-1 during execution of the instructions. In some examples, the CRM 204 and the processor 114-1 are a single component, such as an SoC including the CRM 204 configured as a dedicated memory for the processor 114-1. In some examples, access to the CRM 204 is shared by other components of the radar system 104-1 (e.g., the MMIC 112-1) that are connected to the CRM 204, e.g., via the link 208. The processor 114-1 obtains instructions from the CRM 204 and execution of the instructions configure the processor 114-1 to perform radar operations. Example radar operation include signal processing and radar tracking, which result in communication of the tracks 124 to the vehicle-based systems 200 and other components of the vehicle 102-1 over the link 202. In this example, the CRM 204 may include instructions for configuring the processor 114-1 to generate the data cube 216, generate the detections 122, and resolve the data cubes 216 and the detections 122 into the tracks 124. For example, the CRM 204 includes instructions for executing the radar processing component 118-1, which is an example of the radar processing component 118. Also included in the CRM 204 are instruction sets, which when executed by the processor 114-1, implement a waveform generator 116-1, a radar processing component 118-1, and a radar tracker 120-1, which, respectively is an example of the waveform generator 116, the radar processing component 118, and the radar tracker 120.

When executed by the processor 114-1, the waveform generator 116-1 generates or commands the MMIC 112-1 to generate a stepped frequency waveform based on defined parameters. In aspects, the waveform generator 116-1 may provide instructions for causing the waveform to be generated from the MIMIC 112-1, where the waveform may undergo any number of signal operations, for example, modulation, multiplexing, filtering, and the like. The waveform may then be output by the MMIC 112-1 to a transmit antenna array that transmits the radar signals in the object field of view.

The transmitted radar signals may include the waveform generated using the waveform generator 116-1, and as a result, the radar returns reflected off of objects in the field of view may be processed with a higher signal-to-noise ratio. It should be understood that, though illustrated as the processor 114-1 executing the waveform generator 116-1, the waveform generator 116-1 and processor 114-1 may be implemented together, for example, as an SoC. Further, the waveform generator 116-1 may include any other combination of fixed logical circuitry and be implemented, in whole or in part, through hardware, software, or firmware.

When executed by the processor 114-1, the radar processing component 118-1 determines a two-dimensional representation in the frequency domain of the digitized radar returns output by the MMIC 112-1. For example, the radar processing component 118-1 may use a Fourier Transform to transform the digitized radar returns output from the MIMIC 112-1 in the time domain to the two-dimensional representation of the radar returns in the frequency domain. The two-dimensional representation may include a fast-time dimension corresponding to samples collected over a single chirp and a slow-time dimension corresponding to samples collected over multiple chirps. The radar processing component 118-1 may compensate the two-dimensional representation in the slow-time dimension based on a phase contribution of range values of the two-dimensional representation. In some cases, phase compensation due to range is required due to the use of the parameter determined stepped frequency waveform. In some implementations, the radar processing component may determine a portion of range values less than all of the range values of the two-dimensional representation to perform compensation on. The portion of range values may correspond to ranges of importance in the particular radar frame. In aspects, reducing the phase compensation to a portion of the range values may reduce computation time and processing complexity.

Once the two-dimensional representation of the radar returns in the frequency domain is determined, the radar processing component 118-1 may operate on a peak of the two-dimensional representation, for example, a peak found through peak searching. In doing so, the radar processing component 118-1 may utilize the frequency of the found peak in the fast-time dimension and the frequency of the found peak in the slow-time dimension to solve a two-dimensional system of equations with respect to the range and range rate associated with the found peak. In aspects, the radar processing component 118-1 determines peaks more accurately due to the increased signal-to-noise ratio as a result of transmitting the parameter determined stepped frequency waveform. As a result, object detections or range and range rate calculations for objects in the field of view may be more accurate. The radar processing component 118-1 may output the object detections, the range, or the range rate to the radar tracker 120-1 in the form of the detections 122 or in accordance with a data cube 216. Alternatively, or in addition, the radar processing component 118-1 may output the object detections, the range, or the range rate to the vehicle-based systems 200 directly to assist in performing a vehicle 102-1 function.

The radar tracker 120-1 may output tracks 124. The radar tracker 120-1 may act on the detections 122, the data cube 216, or both. In a specific implementation, the radar tracker 120-1 acts on the detections 122 by grouping, or clustering, the detections 122 to detect objects. The object data may include informational data (e.g., range, range rate, azimuth) that can be used to generate the tracks 124. Tracks 124 may be generated based on any number of detections 122, including a single detection 122 or a group of detections 122. Each of the tracks 124 may include object measurements that indicate information, such as, position, movement, or other properties, of that object. By providing more accurate data from the radar processing component 118-1, the tracks 124 may be of greater accuracy and more reliable for performing actions of the vehicle-based systems 200. The tracks 124 may be updated as the radar system 104 captures additional radar returns over multiple frames. In general, each of the tracks 124 includes object-level information corresponding to an entire, radar-reflective object in the field of view. Each of the tracks 124 may have a structure including numerous fields containing various properties estimated for that particular object. The tracks 124 may be provided to any component of the vehicle 102-1 or the radar system 104-1, including any of the vehicle-based systems 200.

Example Radar System

Figure 3:
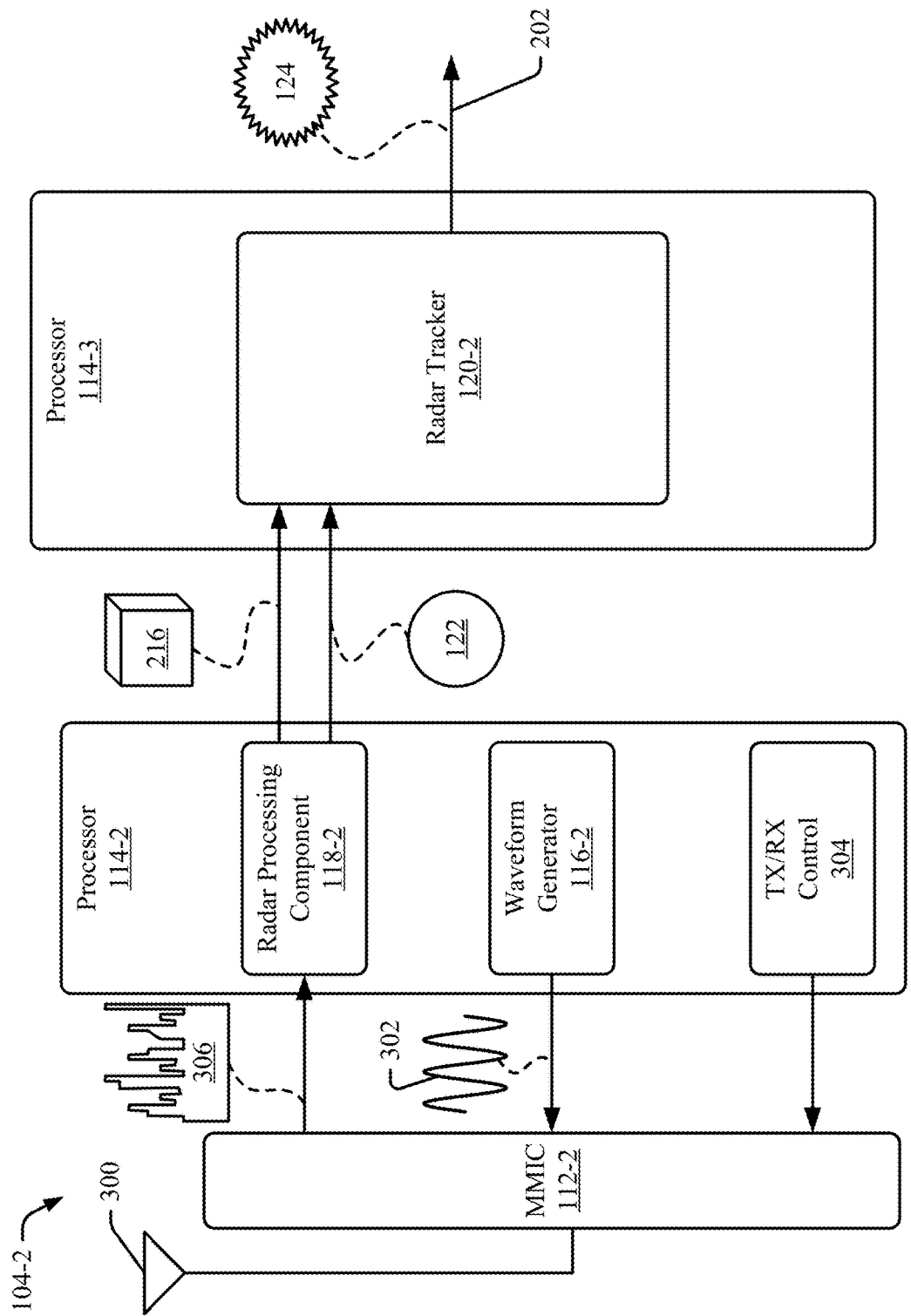
FIG. 3 illustrates an example radar system including a system configured to utilize a parameter defined stepped frequency waveform for a radar system.

FIG. 3 illustrates an example radar system 104-2 including a system configured to utilize a parameter determined stepped frequency waveform for a radar system. The radar system 104-2 is an example of the radar system 104. The radar system 104-2 is illustrated as including a MMIC 112-2, an example of the MMIC 112. The MMIC 112-2 is connected to a receive antenna 300. Examples of a receive antenna may include a MIMO antenna array, although the parameter determined stepped frequency waveform for a radar system can be applied to any radar system. As a result, it should be appreciated that the receive antenna 300 may be any number of radar receive antenna.

The radar antenna 300 transmits radar transmit signals (e.g., radar signals 110-1) in the field of view of the radar system 104-2. The radar transmit signals may include the parameter defined stepped frequency waveform 302 determined using the waveform generator 116-2. The waveform 302 may be governed by a given equation, the parameters of which may be determined based on the specific waveform. For example, the waveform 302 may include one or more frames (e.g., transmitted over time) of radar transmit signals. Each frame of the one or more frames may include a group of at least two chirps (e.g., a single pulse sent at a specific frequency) and the change in frequency between consecutive chirps (e.g., a current chirp and an initial chirp) may be specified by a predetermined equation. In aspects, the change in frequency between consecutive chirps is based on a starting frequency of an initial chirp of the group of chirps, a slope of the initial chirp, an index of the current chirp, and a pulse repetition period of the initial chirp. By defining the waveform 302 in terms of these parameters, a coupling term that contributes noise in the representation of the radar returns in the frequency domain may be canceled. Thus, the waveform 302 may produce a higher signal-to-noise ratio in the frequency representation of the radar returns in the frequency domain.

The waveform 302 may be provided to the MMIC 112-2 where the waveform 302 may undergo any number of signal operations, for example, modulation, multiplexing, filtering, and the like. The waveform 302 may then be output by the MIMIC 112-2 to the radar antenna 300 that transmits the radar signals (e.g., radar signals 110-1) in the object field of view. In this manner, the transmitted radar signals may include the waveform 302 generated using the waveform generator 116-1, and as a result, the radar returns reflected off of objects in the field of view may be processed with a higher signal-to-noise ratio. After the radar antenna 300 transmits the radar transmit signals, they are reflected off of objects in the field of view back towards the radar system 104-2. The processor 114-2, an example of the processor 114, may execute the transmit/receive (TX/RX) control 304, which controls the transmission and reception operations of the MIMIC 112-2. This may include any operation on the waveform 302, for example, digitizing, modulation, multiplexing, or any other transceiver operation. In aspects the TX/RX control 304 allows the antenna 300 to operate as a receive antenna or a transmit antenna.

The radar antenna 300 collects samples of the received radar signals (e.g., radar returns 110-2). The radar transmit signals may reflect off of an object and the radar returns may include multiple chirps transmitted over one or more frames and received at the radar antenna 300. As the radar samples are collected over time, the MMIC 112-2 may process the received radar returns to create digitized receive signals 306 using an analog-to-digital converter. The MIMIC may output the digitized receive signal 306 in the time domain, which results in energy associated with reflections from a single object (e.g., object 108) being represented at various time values.

Within the radar system 104-2 a radar processing component 118-2 may operate on a processor 114-2. The processor 114-2 is an example of the processor 114. The radar processing component 118-2 may input the digitized receive signal 306 and perform a Fourier Transform (e.g., FFT or DFT) to convert the digitized receive signal 306 from the discrete time domain to the discrete frequency domain. In the frequency domain, received radar signals reflected off of a single object will return signals with a same or similar frequency. As a result, the energy received from multiple samples of the multiple chirps sent over at least one frame can be collected and represented with respect to a frequency in the fast-time dimension (e.g., samples collected over a single chirp) and the slow-time dimension (e.g., samples collected across multiple chirps). As described, the representation of the received radar signals is a two-dimensional representation with respect to the fast-time dimension and the slow-time dimension.

In aspects, the radar processing component 118-2 may compensate the slow-time dimension of the two-dimensional representation of the radar receive signals in the frequency domain for the phase contribution due to range. Specifically, the two-dimensional representation may be compensated in the slow-time dimension based on range values of the two-dimensional representation. In aspects, the phase compensation is based on the change in frequency between a current chirp and an initial chirp, the range values of the two-dimensional representation, and the speed of light. In some implementations, the radar system 104-2 may have a portion of the range values that is of interest. In this implementation, the slow-time dimension may only be compensated for the range values within the portion of range values. As a result, the compensation of the two-dimensional representation may require less processing power and less computation time. For example, the radar system 104-2 may be used for blind spot detection and is therefore, primarily concerned with object detections in the range of the blind spot. In another example, the radar system 104-2 may be given an estimate of where an object is in the field of view and a portion of the range values may be determined that encompasses the estimated range. In either example, the slow-time dimension may only be compensated for the portion of range values that are of interest. Alternatively, the slow-time dimension may be compensated for all range values within the instrumented range.

The radar processing component 118-2 may process the two-dimensional representation, for example, by performing peak estimation/finding. Peak estimation may search the two-dimensional representation for energy peaks to differentiate the radar reflections of objects in the field of view from system noise. Peak searching may be performed through a number of understood methods. The radar processing component 118-2 may determine one or more energy peaks in the two-dimensional representation of the digitized receive signal 306 for signal processing.

The radar processing component 118-2 is an example of the radar processing component 118. The radar processing component 118-2 may find an energy peak, or multiple energy peaks, of the two-dimensional representation in the frequency domain and determine data associated with the one or more peaks. Due to the use of the parameter defined stepped frequency waveform, the two-dimensional representation in the frequency domain may have a higher signal-to-noise ratio after correct phase compensation and thus, peaks may be found and filtered more accurately. A frequency in the fast-time dimension and the slow-time dimension may be determined for the energy peak by the radar processing component 118-2 and used in a system of equations to determine data associated with the energy peak including a range and range rate. For example, a system of equations may be utilized which includes two unknowns, range and range rate. The two frequencies (e.g., in the fast-time dimension and in the slow-time dimension) may be represented in terms of range and range rate. As a result of the high signal-to-noise ratio, the range and range rate associated with the energy peak and determined from the two-dimensional system of equations may be a more accurate range and unambiguous range rate.

The data, including range and range rate, associated with the energy peak may be output to a radar tracker 120-2. The radar tracker 120-2 is an example of the radar tracker 120. As illustrated, the radar tracker operates on a processor 114-3. It should be appreciated, however, that the radar system 104-2 may operate on a single processor or multiple processors. Therefore, while shown as implemented on the processor 114-3, the radar tracker 120-2 may be implemented on a same processor (e.g., processor 114-2 or any other processor) as other elements of the radar system 104-2 (e.g., the radar processing component 118-2 and the like).

In some implementations, the data associated with the energy peak is output in one of two ways: as a detection 122 or a data cube 216 that includes the data. For example, the detections 122 may be output as data including the range and range rate associated with the energy peak. As such, objects may be determined based on a single detection, or multiple detections, of the detections 122. The detections 122 may be input to the radar tracker 120-2 where the range, range rate, and location of the object enables the radar tracker 120-2 to perform radar tracking. In an aspect, by providing a higher signal-to-noise ratio and more accurate range and range rate determinations through the radar processing component 118-2, the radar tracker 120-2 may perform more accurate radar tracking, even at high range rates. In another example, the data associated with the energy peak is included as part of the data cube 216. The radar tracker 120-2 may input the data cube and perform object tracking based on information available within the data cube 216. In yet another example, both the detections 122 and the data cube 216 may be used to enable radar tracking by the radar tracker 120-2. Alternatively, or in addition, the detections 122 may be output along the link 208 directly, when radar tracking is not required. For example, in simple object detection.

The radar tracker 120-2 may perform radar tracking by generating the internal radar tracks based on the detections 122, the data cube 216, or both. The radar tracks 124 may be output to any other element of the radar system 104-2 or to any of the vehicle-based systems (e.g., vehicle-based systems 200). For example, the radar tracker 120-2 may determine tracks 124 based on the detections 122 or the data cube 216 and output the tracks 124 along the link 202. In the case of the radar system implemented on a vehicle (e.g., vehicle 102) the link 202 may communicate with a vehicle subsystem to utilize the tracks 124 to aid a vehicle function.

The radar tracker 120-2 may update the tracks 124 as radar signals capture and process additional radar returns over multiple frames. The tracks 124 define position, and other information about an object external to the radar system 104-2. In some instances, the radar tracker 120-2 may incorporate a track filter function. When configured to execute a track filter function, the radar tracker 120-2 may include a measurement model, such as a nearly Coordinated-Turn Constant-Acceleration (CTCA) motion model, to model the dynamic behavior of the tracks 124. Any other appropriate track filter motion model can be used by the radar tracker 120-2, such as Cartesian Constant Acceleration, or Coordinated Turn model may be paired with any appropriate track filter method such as Extended Kalman filter, Unscented Kalman filter, Probability Hypothesis Density (PHD) filter, Particle filter, or the like.

In this way, the radar system 104-2 outputs, as the set of highly accurate tracks 124 with reference to an object in a scene, or highly accurate detections 122. The radar output may appear similar to outputs from other radar trackers; however, tracks output from the radar system 104-2 may be more accurate than tracks from these other trackers by way of using data (e.g., range and range rate) associated with energy peaks determined from the two-dimensional representation with a high signal-to-noise ratio. The techniques do not require alteration of existing predictive models, instead offer plug-and-play enhancement with these, and other radar software and hardware systems. Some other radar systems can be replaced by the radar system 104-2 to convey tracks 124 or detections 122 more accurately from using the more accurate data from the radar processing component 118-2. Improving accuracy and fidelity of a radar output in this way may improve operations of perception systems that rely on the radar output. In the case of an autonomous driving function or advanced safety feature of a vehicle (e.g., vehicle 102), the radar system 104-2 may be relied upon to safely maneuver the vehicle on a road. Driving decisions supported by the radar system 104-2 may result in safe and comfortable vehicle behavior, which may improve driving safety for many classes (e.g., low-cost, commercial, and luxury) of vehicles.

Example Waveform

Figure 4:
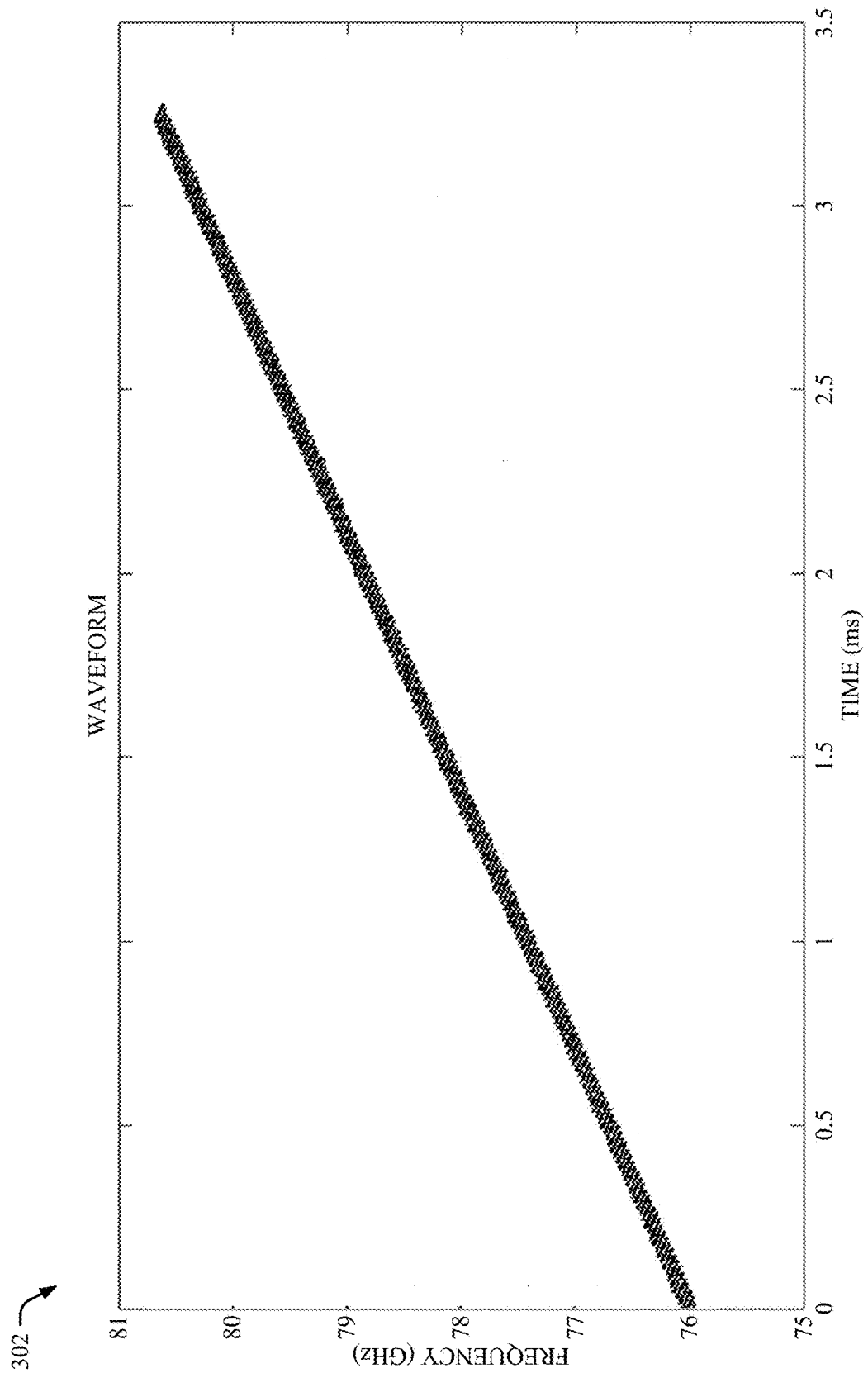
FIG. 4 illustrates an example of a parameter defined stepped frequency waveform for a radar system.

FIG. 4 illustrates an example of a parameter defined stepped frequency waveform 302 for a radar system. Specifically, FIG. 4 illustrates the waveform 302 with respect to time and frequency. The frequency is shown in Gigahertz (GHz) while the time is shown in milliseconds (ms). As is illustrated in FIG. 4, the waveform 302 is a stepped frequency waveform 302. As such, the frequency of the waveform changes with respect to time. In aspects, the waveform 302 includes multiple chirps set over at least one frame. The change in frequency between consecutive chirps can be defined by parameters such that the resulting radar receive signals have a high signal-to-noise ratio in the frequency domain.

Specifically, the change in frequency may be defined to cancel out a coupling term in the phase representation of the radar returns that causes noise and spectrum broadening in the frequency domain. For example, the change in frequency between consecutive pulses may be defined by the given equation:

$$\Delta f(k) = \frac{-f_0 + \sqrt{f_0^2 - 4 \cdot S \cdot k \cdot PRP \cdot f_0}}{2}$$

where k is the chirp index, $\Delta f(k)$ is the change in frequency between the kth chirp and the initial chirp, $f_0$ is the starting frequency of the frame or the frequency of the first chirp, S is the slope of the first chirp, and PRP is the pulse repetition period (e.g., time between chirps) of the first chirp. In varying the frequency of the chirps, the pulse repetition period of each chirp may vary. For example, the pulse repetition period may decrease as the pulse index increases. In this example, the chirps are sent more frequently as the frame continues.

A delay time for a given pulse may be defined with respect to the beginning of a frame. Specifically, the time delay for the kth chirp may be defined by the following equation:

$$T_k = k \cdot PRP \cdot \frac{f_0}{f_0 + \Delta f(k)}$$

where $T_k$ is the delay time for the kth chirp, k is the chirp index, $\Delta f(k)$ is the change in frequency between the kth chirp and the initial chirp, $f_0$ is the starting frequency of the frame or the frequency of the first chirp, and PRP is the pulse repetition period (e.g., time between chirps) of the first chirp.

Example Method

Figure 5:
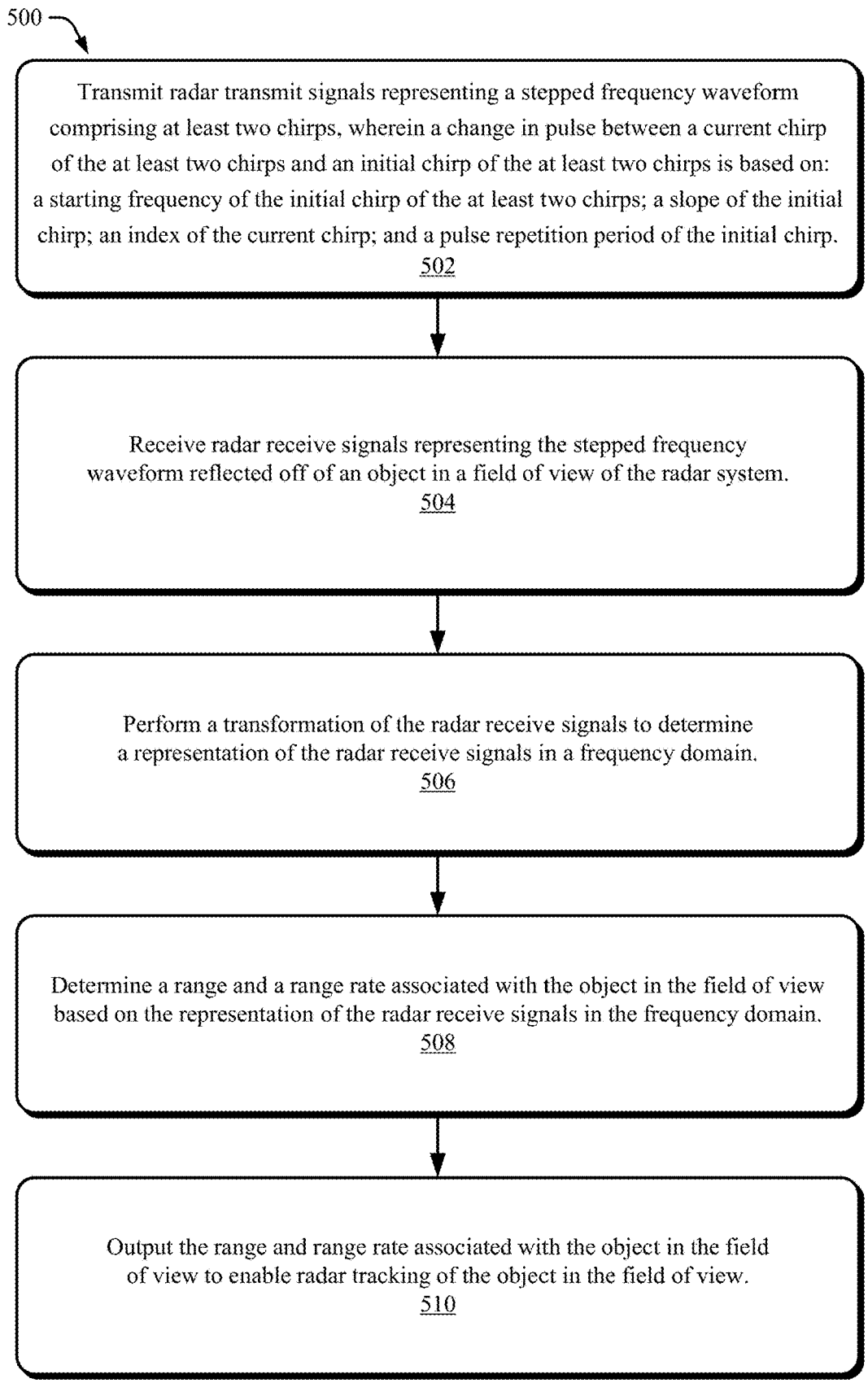
FIG. 5 illustrates an example method for a parameter defined stepped frequency waveform for a radar system.

FIG. 5 illustrates an example method 500 for a parameter defined stepped frequency waveform for a radar system. The operations (or steps) 502 through 510 are performed but are not necessarily limited to the order or combinations in which the operations are shown herein. Further, any of one or more of the operations may be repeated, combined, or reorganized to provide other operations. For ease of description, the method 500 is described with respect to the elements of FIG. 1.

At 502, radar signals 110-1 representing a stepped frequency waveform are transmitted by the radar system 104. The radar signals 110-1 may be transmitted over multiple frames (e.g., over time) with each frame including multiple chirps (e.g., pulses). The number of chirps per frame may vary based on design requirements. For example, a larger number of chirps per frame may produce a higher signal-to-noise ratio and allow detections at greater distances. However, higher chirps per frame may also increase the data complexity and computation time of radar processing. The radar signals 110-1 include at least two chirps defined with a change in frequency based on a starting frequency ($f_0$), a slope of the first chirp (S), a chirp index (k), and a pulse repetition period of the first chirp (PRP). Specifically, the phase response of radar returns 110-2 can be represented as the following equation:

$$\frac{\Phi_{IF}}{2\pi}(m, k) =$$
$$-\frac{2 \cdot R}{c}\left[f_0 + \Delta f(k) + S \cdot \frac{m}{f_s}\right] - \frac{2 \cdot v}{c}\left[f_0 + \Delta f(k) + S \cdot \frac{m}{f_s}\right] \cdot \left[\frac{m}{f_s} + T_k\right] \text{ where,}$$

$$T_k = k \cdot PRP \cdot \frac{f_0}{f_0 + \Delta f(k)}$$

In the above equation, $\Phi_{IF}$ is the phase response of the radar returns, m is the index of samples within a chirp, $f_s$ is the sampling frequency, R is a target range, v is the target range rate, and $T_k$ is the delay time of the kth chirp from the beginning of the frame. In aspects, the target range and target range rate are unknowns that can be solved for to determine the range and range rate of an object in the field of view. This equation can be expanded in the following form:

$$\frac{\Phi_{IF}}{2\pi}(m, k) = -\frac{2 \cdot f_0 \cdot R}{c} - \frac{2 \cdot \Delta f(k) \cdot R}{c} - \frac{2 \cdot S \cdot R}{c} \cdot \frac{m}{f_s} - \frac{2 \cdot f_0 \cdot v}{c} \cdot \frac{m}{f_s} -$$
$$\frac{2 \cdot \Delta f(k) \cdot v}{c} \cdot \frac{m}{f_s} - \frac{2 \cdot S \cdot v}{c} \cdot \left(\frac{m}{f_s}\right)^2 - \frac{2 \cdot f_0 \cdot v}{c} \cdot k \cdot PRP - \frac{2 \cdot S \cdot v}{c} \cdot \frac{m}{f_s} \cdot T_k$$

From this equation, the terms can be broken apart based on their contribution to a two-dimensional Fourier transform that transforms the radar returns into the frequency space. As such, the phase response can be broken down into constant terms, terms that contribute to the fast-time dimension, terms that contribute to the slow-time dimension, and a coupling term. When breaking down the phase response into contributing terms, the coupling term is shown to cause spectrum spreading, or a drop of signal level in a two-dimensional Fourier transform of the radar returns. In some instances, spectrum spreading, or increased noise, is more prominent at higher range rates.

To reduce the spectrum spreading due to the coupling term, the coupling term may be canceled by defining the change in frequency between the current chirp and the initial chirp in such a way as to cancel the coupling term. For example, the following relation may be defined to cancel the coupling term:

$$\frac{2 \cdot \Delta f(k) \cdot v}{c} \cdot \frac{m}{f_s} = -\frac{2 \cdot S \cdot v}{c} \cdot \frac{m}{f_s} \cdot k \cdot PRP \cdot \frac{f_0}{f_0 + \Delta f(k)}$$

By rearranging the above equation and solving for Δf(k), the waveform may be defined with a change in frequency of the current chirp with reference to the initial chirp as follows:

$$\Delta f(k) = \frac{-f_0 + \sqrt{f_0^2 - 4 \cdot S \cdot k \cdot PRP \cdot f_0}}{2}$$

By defining the waveform in this way, the signal-to-noise ratio of the reflected radar returns 110-2 may be increased in the frequency spectrum and spectrum broadening may be eliminated, even at high range rates. In aspects, the waveform is generated by the processor 114 through execution of the waveform generator 116. The transmitted radar signals 110-1 may be representative of the above parameter defined stepped frequency waveform. In aspects, the radar signals 110-1 are modulated, multiplexed, or filtered using the MIMIC 112, which may be implemented as a single MIMIC or multiple MMICs. Therefore, the transmitted radar signals 110-1 may be identical with, or similar to, the waveform detailed above.

Any of the parameters used to define the waveform may be predetermined, for example, as provided by a user input to enable waveform generation. Any of the parameters may be stored in a memory associated with the radar system to be used in subsequent waveform generation. To generate a waveform, or any portion of the waveform, any of the parameters may be retrieved from memory associated with the waveform. This may include, for example, memory implemented within the radar system or memory communicatively coupled to the radar system through a link or data bus.

At 504, radar returns 110-2 are received by the radar system 104 as radar signals 110-1, including the stepped frequency waveform from step 502, transmitted in a field of view 106 and reflected off of an object 108. The radar returns may be received by the radar system 104 at one or more radar sensors. In some implementations, the radar system 104 is implemented in a vehicle 102 as part of a perception system. In this implementation, the radar sensors may be located anywhere on the vehicle 102, for example, anywhere on the front, rear, sides, doors, mirrors, and the like. In aspects, the radar returns 110-2 may be represented in a fast-time dimension (e.g., samples collected over a single chirp) and a slow-time dimension (e.g., samples collected across multiple chirps). When received by the radar system 104, the radar-returns 110-2 are represented in the time domain. The one or more processors 114, perform various operations, including analog-to-digital conversion, to produce digitized radar returns. In some instances, the digitized radar returns are generated by a MMIC 112. The digitized radar returns are represented in the time domain, with energy associated with reflections off the object 108 spread across multiple times.

At 506, a transformation is performed to determine a two-dimensional representation of the radar returns 110-2 in the frequency domain, where reflections off the object 108 are represented at a single or similar frequency. In aspects, the transformation is performed by the processor 114 through execution of the radar processing component 118. The two-dimensional representation may include the radar returns 110-2 with respect to the fast-time dimension and the slow-time dimension. The digitized radar returns 110-2 are processed using the processor 114 through a two-dimensional Fourier transform, for example, an FFT or DFT. In the frequency space, peak searching may be performed by the at least one processor 114 to determine an energy peak or multiple energy peaks. In some implementations, the peak searching is performed to differentiate reflections off the object 108 from system noise. An energy peak may be found and execution of the radar processing component 118 may determine data associated with the energy peak.

In aspects, the transformation to determine a two-dimensional representation of the radar returns 110-2 in the frequency domain includes compensating the slow-time dimension for a phase contribution of the target range. In some implementations, the slow-time domain is compensated by the processor 114 through execution of the radar processing component 118. In aspects the phase may be compensated based on the change in frequency of the kth chirp, the speed of light, and target range using the following equation:

$$-\frac{2 \cdot \Delta f(k)}{c} \cdot R$$

For example, the radar returns 110-2 may model the field of view with range values extending from 0 to 500 meters. Thus, the slow-time dimension may be compensated using the above equation at range values from 0 to 500 meters.

In some implementations, there exists a portion of interest within the range values of the two-dimensional representation of radar returns 110-2 in the frequency domain. In these implementations, the slow-time dimension of the two-dimensional representation may be compensated only for the portion of interest of range values. For example, the radar system 104 may be given an estimation that an object exists near a range of 150 meters. As a result, the radar system 104 may choose to compensate the slow-time dimension of the two-dimensional representation only between target ranges of 130 and 160 meters. This implementation may be beneficial when object detections are expected at a particular range, for example, in blind spot monitoring.

At 508, a range and a range rate associated with the object 108 in the field of view 106 is determined based on the two-dimensional representation of the radar returns 110-2 in the frequency domain. For example, an energy peak or multiple energy peaks may be found within the two-dimensional representation of the radar returns 110-2 in the frequency domain. In aspects, the one or more energy peaks may be associated with an object in the field of view. For example, the object 108 may be represented in the radar returns 110-2 by a single energy peak in the two-dimensional representation. In another example, the object 108 may reflect the radar signals 110-1 to create multiple energy peaks from the two-dimensional representation that can be grouped to represent the object 108. In aspects, the energy peak determined from the two-dimensional representation of the radar returns 110-2 in the frequency domain may be more accurate and include a decreased likelihood of false detection or failure to identify a true detection. Additionally, data may be determined for an energy peak, or a group of energy peaks, including a highly accurate range and range rate of the object 108.

Specifically, a frequency of the energy peak may be determined in the fast-time dimension and a frequency may be determined in the slow-time dimension. Using the frequency in the fast-time dimension and the frequency in the slow-time dimension, the radar processing component 118 may be executed to solve a two-dimensional system of equation that produces the range and range rate of the object 108. The two-dimensional system of equation may be determined from the Fourier transform of the phase response of the radar returns 110-2. For example, by defining the change in frequency between consecutive chirps, the phase response may reduce to the following equation:

$$\frac{\Phi_{IF}}{2\pi}(m, k) = -\frac{2 \cdot f_0 \cdot R}{c} - \frac{2 \cdot \Delta f(k) \cdot R}{c} - \frac{2 \cdot S \cdot R}{c} \cdot \frac{m}{f_s} - \frac{2 \cdot f_0 \cdot v}{c} \cdot \frac{m}{f_s} - \frac{2 \cdot S \cdot v}{c} \left(\frac{m}{f_s}\right)^2$$

In some implementations, the second order terms are neglected due to a negligible effect in relation to the first order terms. By performing a Fourier transform, the phase response can be represented in the frequency domain and an energy peak may be determined. The energy peak may correspond to a frequency in the fast-time dimension and the frequency in the slow-time dimension, and thus, range and range rate may be determined for the object 108 associated with the energy peak using a two-dimensional system of equations. Specifically, the frequency in the fast time domain may be represented as:

$$F_{b_{fast-time}} = p^* \frac{f_s}{M} = -[f_R \cdot R + f_D \cdot v]$$

where, $$f_R = \frac{2 \cdot S}{c}, \text{ and } f_D = \frac{2 \cdot f_0}{c}$$

Similarly, the frequency in the slow-time domain after ranging phase compensation may be represented as:

$$f_{b_{slow-time}} = q^* \frac{\frac{1}{PRP}}{K} = -f_D \cdot v$$

In the equation above, $f_R$ represents the ranging frequency (e.g., phase shift per unit range), $f_D$ represents the doppler frequency (e.g., phase shift per unit range rate), M represents the samples per chirp, and K represents the chirps per frame. Additionally, the fractional bin index in the fast-time dimension and the fractional bin index in the slow-time dimension can be represented as p* and q*, respectively. By solving the system of equations using the frequencies associated with an energy peak of the two-dimensional representation of the radar returns 110-2 in the frequency domain, the range and range rate of the object 108 can be solved for. Due to the higher signal-to-noise ratio in the two-dimensional representation because of decreased spectrum spreading, the range and range rate determined from the system of equations may be more accurate and the range rate may be unambiguous.

At 510, the data associated with the energy peak of the two-dimensional representation is output to enable radar tracking of the object 108. In some implementations, the data associated with the energy peak is output as detections 122. The detections 122 may include information on the position and movement of the object 108. In other implementations, the data associated with the energy peak is included within a data cube output. The detections 122, the data cube, or both may be input to a radar tracker 120 to determine internal radar tracks. The internal radar tracks may be output to an output interface, which resolves the internal radar tracks and outputs tracks 124 for radar tracking. In some implementations, the tracks 124 are output to a vehicle subsystem of the vehicle 102 to aid in performing a vehicle function.

Example Results

Figure 6:
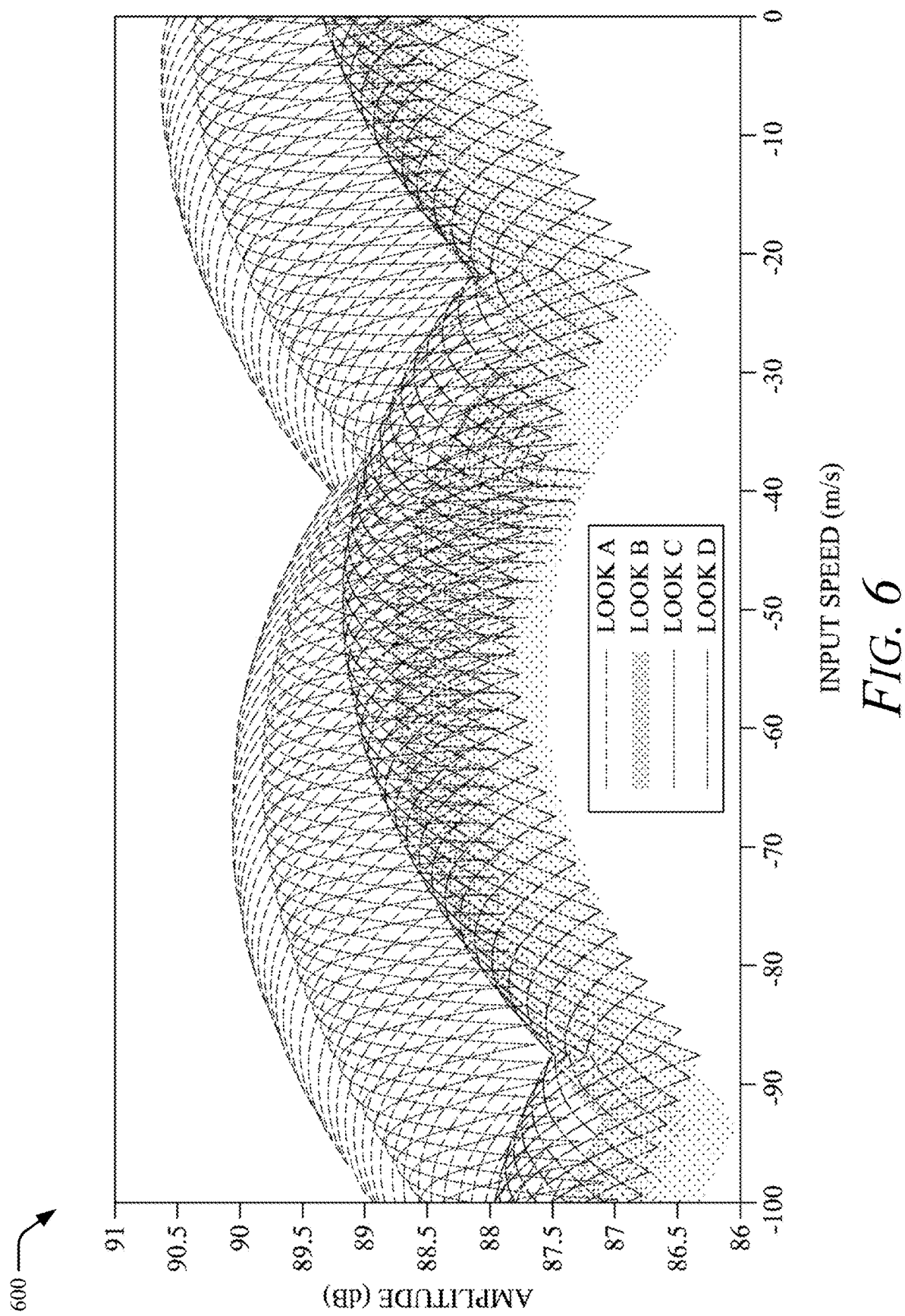
FIG. 6 illustrates example results of a generic stepped frequency waveform for a radar system.

FIG. 6 illustrates example results 600 of a generic stepped frequency waveform for a radar system. The results 600 are measured with respect to four radar looks. In the results 600, multiple radar looks defined as radar data from an independent operation of the radar system are used to collect amplitude data over multiple input speeds. In each look: look A, look B, look C, and look D, the radar system is operated at input speeds (e.g., relative velocity between the radar system and the object or range rate) between 0 and 100 meters per second (m/s). It should be noted that the results 600 are simulated only for negative input speeds, however, due to the symmetric nature of doppler shifts, the radar data should look similar or identical for positive input speeds. In other words, it is not relevant to the current results whether the range between the radar system and the object is increasing or decreasing. In each look, a signal strength can be compared based on the amplitude with respect to input speed.

In look A, the amplitude is highest at approximately 90.6 dB at an input speed of 0 m/s. As illustrated, when input speed increases, the signal strength (e.g., amplitude) begins to decrease. For example, at 100 m/s the peak amplitude is approximately 88.9 dB. Look B provides similar result that show the peak amplitude decreasing from approximately 89.1 dB at 0 m/s to approximately 87.3 dB at 100 m/s. Similarly, Look C shows amplitude degrading with respect to input speed. Specifically, look C illustrates the amplitude at 0 m/s as approximately 90.3 dB, while the amplitude at 100 m/s is approximately 88.6 dB. Look D further illustrates decreasing amplitude as input speed decreases. For example, look D has an amplitude of approximately 89.3 dB at 0 m/s and an amplitude of approximately 88.0 dB at 100 m/s. The decrease in amplitude as input speed increases causes spectrum spreading and decreases signal-to-noise ratio at high input speeds. In aspects, this may cause failures in object detection or errors in range and range rate determination. For example, signal amplitude may drop approximately 1 dB per 100 m/s. Further, lobing structures may be created due to the fractional bin position in the fast-time dimension and the slow time dimension.

Figure 7:
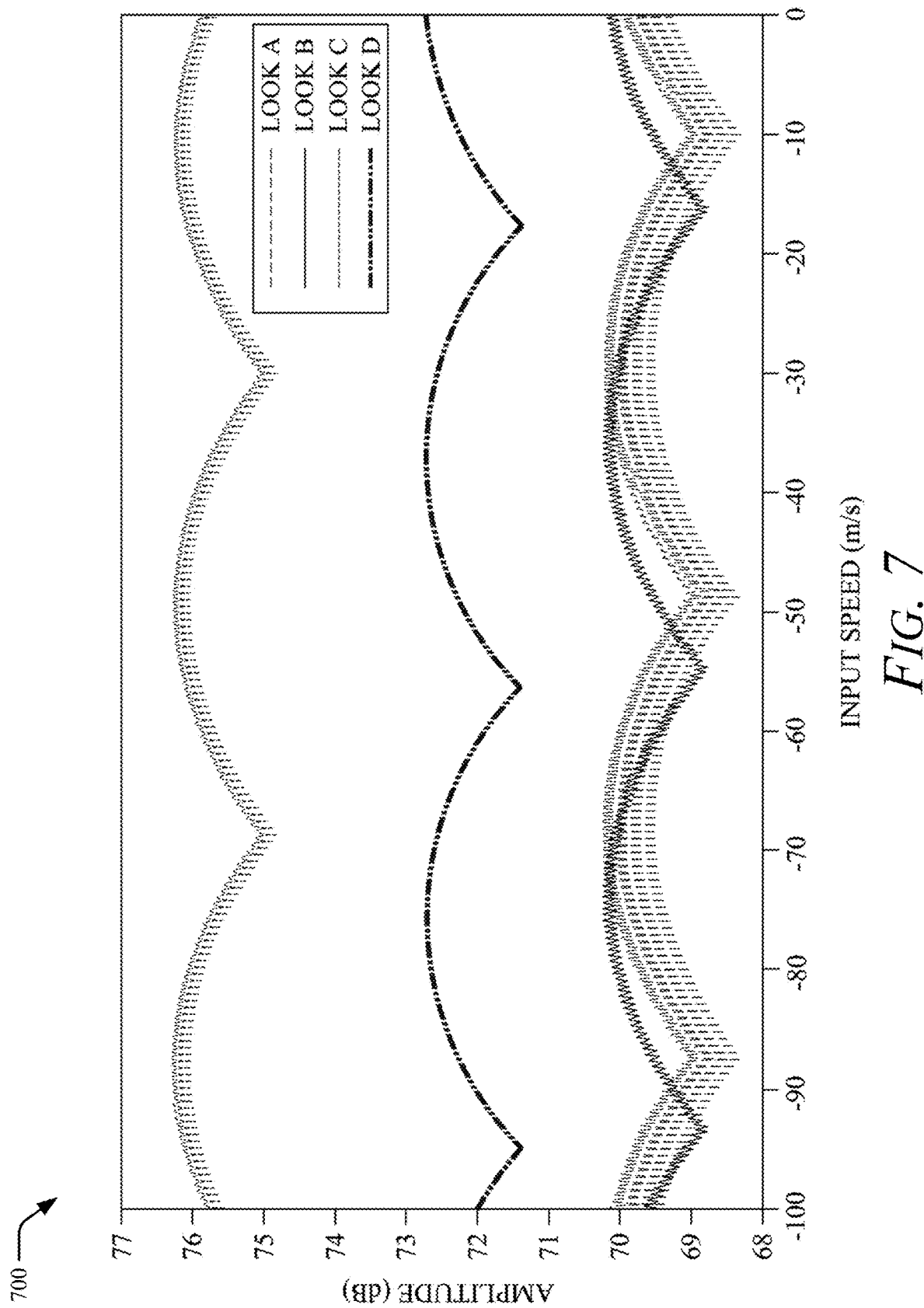
FIG. 7 illustrates example results of a parameter defined stepped frequency waveform for a radar system.

FIG. 7 illustrates example results of a parameter defined stepped frequency waveform for a radar system. Similar to the results 600, the results 700 are measured with respect to four radar looks: look A, look B, look C, and look D. The looks are taken over input speeds of 0 to 100 m/s.

In look A, the amplitude fluctuates across input speeds, however, the fluctuation is symmetric across input speeds. Specifically, the amplitude does not seem to decrease asymmetrically at high input speeds. For example, the peak amplitude is nearly identical at 0 m/s and 100 m/s at 70.1 dB. Look B provides similar result that show that the amplitude does not decrease asymmetrically with input speed. For example, the amplitude at 0 m/s and 76 m/s are nearly identical at 72.8 dB. Similarly, Look C shows amplitude degrading with respect to input speed. Specifically, look C illustrates the amplitude at 11 m/s and 98 m/s as nearly identical at 76.2 dB. Look D further illustrates a cyclical amplitude with respect to input speed. For example, look D has a nearly identical amplitude of 70.2 at 0 m/s and 74 m/s. As is shown by the results 700, the parameter defined stepped frequency waveform for a radar system provides a radar response without degrading amplitude at high input speed between a target and the radar system. In aspects, the cancellation of coupling terms eliminates the signal level degradation due to higher range rates, and thus, enables accurate detections to be determined for objects in the field of view of the radar system. In doing so, radar tracking may be performed more robustly and, when relied upon for autonomous control of a vehicle, the radar system may allow for safe, comfortable driving.

ADDITIONAL EXAMPLES

Some additional examples are as follows.

Example 1. A method comprising: transmitting, by a radar system, radar transmit signals representing a parameter defined stepped frequency waveform having at least two chirps including an initial chirp and a current chirp, wherein a change in pulse between the initial chirp and the current chirp is based on: a starting frequency of the initial chirp; a slope of the initial chirp; an index of the current chirp; and a pulse repetition period of the initial chirp; receiving, by the radar system, radar receive signals representing the parameter defined stepped frequency waveform reflected off of an object in a field of view of the radar system; performing a transformation of the radar receive signals to determine a representation of the radar receive signals in a frequency domain; determining a range and a range rate associated with the object in the field of view based on the representation of the radar receive signals in the frequency domain; and outputting, to a radar tracker, the range and range rate associated with the object in the field of view to enable radar tracking of the object in the field of view.

Example 2. The method as recited by any of the previous examples, wherein the parameter defined stepped frequency waveform for the frame further comprises a delay time of the current chirp from a beginning of the frame based on: the starting frequency of the initial chirp; the index of the current chirp; and the pulse repetition period of the initial chirp.

Example 3. The method as recited by any of the previous examples, wherein performing a transformation of the radar receive signals to determine the representation of the radar receive signals in the frequency domain comprises: performing a two-dimensional Fourier transform of the radar receive signals to generate a two-dimensional representation of the radar receive signals in the frequency domain, the two-dimensional representation including a fast-time dimension and a slow-time dimension.

Example 4. The method as recited by any of the previous examples, wherein determining the range and the range rate associated with the object in the field of view based on the representation of the radar receive signals in the frequency domain comprises: determining a peak of the two-dimensional representation of the radar receive signals; and determining the range and the range rate corresponding to the peak of the two-dimensional representation of the radar receive signals.

Example 5. The method as recited by any of the previous examples, wherein determining the range and the range rate corresponding to the peak of the two-dimensional representation of the radar receive signals comprises: determining a fast-time frequency and a slow-time frequency associated with the peak of the two-dimensional representation of the radar receive signals; and determining the range and the range rate corresponding to the fast-time frequency and the slow-time frequency associated with the peak of the two-dimensional representation.

Example 6. The method as recited by any of the previous examples, wherein performing the transformation of the radar receive signals to determine the representation of the radar receive signals in the frequency domain further comprises: compensating for a phase contribution of the radar receive signals in the slow-time dimension based on range values of the two-dimensional representation of the radar receive signals.

Example 7. The method as recited by any of the previous examples, the two-dimensional representation of the radar receive signals further comprises a collection of range values; and compensating for the phase contribution of the radar receive signals in the slow-time dimension based on the range values of the two-dimensional representation of the radar receive signals comprises: compensating, for a portion of the collection of range values, the slow-time dimension of the two-dimensional representation based on the portion of the collection of range values of the two-dimensional representation.

Example 8. The method as recited by any of the previous examples, w wherein determining a range and a range rate associated with the object in the field of view based on the representation of the radar receive signals in the frequency domain comprises neglecting second order terms.

Example 9. The method as recited by any of the previous examples, wherein the current chirp is a subsequent chirp transmitted after the initial chirp.

Example 10. The method as recited by any of the previous examples, further comprising determining, based on a user input, one or more of the starting frequency of the initial chirp, a slope of the initial chirp, or a pulse repetition period of the initial chirp.

Example 11. The method as recited by any of the previous examples, further comprising maintaining, in a memory in communication with the radar system, one or more of the starting frequency of the initial chirp; a slope of the initial chirp; or a pulse repetition period of the initial chirp.

Example 12. The method as recited by any of the previous examples, wherein transmitting radar transmit signals representing the parameter defined stepped frequency waveform comprises: obtaining, by a multiple-input multiple-output integrated circuit of the radar system and from a memory in communication with the radar system, the starting frequency of the initial chirp, the slope of the initial chirp, or the pulse repetition period of the initial chirp.

Example 13. A system comprising: a radar system having at least one processor configured to: transmit, from the radar system, radar transmit signals representing a parameter defined stepped frequency waveform having at least two chirps including an initial chirp and a current chirp, wherein a change in pulse between the initial chirp and the current chirp is based on: a starting frequency of the initial chirp; a slope of the initial chirp; an index of the current chirp; and a pulse repetition period of the initial chirp; receive, at the radar system, radar receive signals representing the parameter defined stepped frequency waveform reflected off of an object in a field of view of the radar system; perform a transformation of the radar receive signals to determine a representation of the radar receive signals in a frequency domain; determine a range and a range rate associated with the object in the field of view based on the representation of the radar receive signals in the frequency domain; and output, to a radar tracker, the range and range rate associated with the object in the field of view to enable radar tracking of the object in the field of view.

Example 14. The system as recited by any previous example, wherein the parameter defined stepped frequency waveform for the frame further comprises a delay time of the current chirp from a beginning of the frame based on: the starting frequency of the initial chirp; the index of the current chirp; and the pulse repetition period of the initial chirp.

Example 15. The system as recited by any of the previous examples, wherein the processor is configured to perform a transformation of the radar receive signals to determine the representation of the radar receive signals in the frequency domain by: performing a two-dimensional Fourier transform of the radar receive signals to generate a two-dimensional representation of the radar receive signals in the frequency domain, the two-dimensional representation including a fast-time dimension and a slow-time dimension.

Example 16. The system as recited by any of the previous examples, wherein the processor is configured to determine the range and the range rate associated with the object in the field of view based on the representation of the radar receive signals in the frequency domain by: determining a peak of the two-dimensional representation of the radar receive signals; and determining the range and the range rate corresponding to the peak of the two-dimensional representation of the radar receive signals.

Example 17. The system as recited by any of the previous examples, wherein the processor is configured to determine the range and the range rate corresponding to the peak of the two-dimensional representation of the radar receive signals by: determining a fast-time frequency and a slow-time frequency associated with the peak of the two-dimensional representation of the radar receive signals; and determining the range and the range rate corresponding to the fast-time frequency and the slow-time frequency associated with the peak of the two-dimensional representation.

Example 18. The system as recited by any of the previous examples, wherein the processor is configured to perform the transformation of the radar receive signals to determine the representation of the radar receive signals in the frequency domain by: compensating for a phase contribution of the radar receive signals in the slow-time dimension based on range values of the two-dimensional representation of the radar receive signals.

Example 19. The system as recited by any of the previous examples, wherein: the two-dimensional representation of the radar receive signals further comprises a collection of range values; and the processor is configured to compensate for the phase contribution of the radar receive signals in the slow-time dimension based on the range values of the two-dimensional representation of the radar receive signals by compensating, for a portion of the collection of range values, the slow-time dimension of the two-dimensional representation based on the portion of the collection of range values of the two-dimensional representation.

Example 20. The system as recited by any of the previous examples, wherein the processor is further configured to: maintain, in a memory of the radar system, one or more of the starting frequency of the initial chirp; the slope of the initial chirp; or the pulse repetition period of the initial chirp.

Example 21. The system as recited by any of the previous examples, further comprising a multi-input multiple-output integrated circuit configured to: obtain, from a memory of the radar system, one or more of the starting frequency of the initial chirp, the slope of the initial chirp, or the pulse repetition period of the initial chirp; and generate the parameter defined stepped frequency waveform based on the one or more of the starting frequency of the initial chirp, the slope of the initial chirp, or the pulse repetition period of the initial chirp obtained from the memory.

Example 22. The system as recited by any of the previous examples, wherein the radar system is installed in a vehicle.

Example 23. A system comprising means for performing the method as recited by any previous example.

Example 24. A computer-readable storage medium comprising instructions that when executed by a processor cause a radar system to perform the method as recited by any previous example.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the spirit and scope of the disclosure as defined by the following claims. Problems associated with spectrum spreading and signal degradation at high range rates may occur in other systems. Therefore, although described with respect to specific radar system elements, the techniques, apparatuses, and systems of the present disclosure offer plug and play compatibility with other radar systems.

The use of "or" and grammatically related terms indicates non-exclusive alternatives without limitation unless the context clearly dictates otherwise. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

What is claimed is:

1. A method comprising:
    transmitting, by a radar system, radar transmit signals representing a parameter defined stepped frequency waveform for a frame having at least two chirps including an initial chirp in the frame and a current chirp in the frame, the transmitting of the radar transmit signals representing the parameter defined stepped frequency waveform including,
        determining a pulse frequency for the current chirp relative to a pulse frequency of the initial chirp that cancels a coupling term in a frequency domain representation of radar receive signals received in response to the transmitting of the radar transmit signals based on: i) a starting frequency of the initial chirp; ii) a slope of the initial chirp; iii) an index of the current chirp; and iv) a pulse repetition period of the initial chirp, and
        outputting the current chirp of the parameter defined stepped frequency waveform having the pulse frequency that cancels the coupling term in the frequency domain representation of the radar receive signals;
    receiving, by the radar system, the radar receive signals representing the parameter defined stepped frequency waveform reflected off of an object in a field of view of the radar system;
    performing a transformation of the radar receive signals to determine a representation of the radar receive signals in the frequency domain with the representation of the radar receive signals in the frequency domain having the coupling term cancelled therefrom;
    determining a range and a range rate associated with the object in the field of view based on the representation of the radar receive signals in the frequency domain; and
    outputting, to a radar tracker, the range and range rate associated with the object in the field of view to enable radar tracking of the object in the field of view.

2. The method of claim 1, wherein the parameter defined stepped frequency waveform for the frame further comprises a delay time of the current chirp from a beginning of the frame based on:
    the starting frequency of the initial chirp;
    the index of the current chirp; and
    the pulse repetition period of the initial chirp.

3. The method of claim 1, wherein performing a transformation of the radar receive signals to determine the representation of the radar receive signals in the frequency domain comprises:
    performing a two-dimensional Fourier transform of the radar receive signals to generate a two-dimensional representation of the radar receive signals in the frequency domain, the two-dimensional representation including a fast-time dimension and a slow-time dimension.

4. The method of claim 3, wherein determining the range and the range rate associated with the object in the field of view based on the representation of the radar receive signals in the frequency domain comprises:
    determining a peak of the two-dimensional representation of the radar receive signals; and
    determining the range and the range rate corresponding to the peak of the two-dimensional representation of the radar receive signals.

5. The method of claim 4, wherein determining the range and the range rate corresponding to the peak of the two-dimensional representation of the radar receive signals comprises:
    determining a fast-time frequency and a slow-time frequency associated with the peak of the two-dimensional representation of the radar receive signals; and
    determining the range and the range rate corresponding to the fast-time frequency and the slow-time frequency associated with the peak of the two-dimensional representation.

6. The method of claim 3, wherein performing the transformation of the radar receive signals to determine the representation of the radar receive signals in the frequency domain further comprises:
    compensating for a phase contribution of the radar receive signals in the slow-time dimension based on range values of the two-dimensional representation of the radar receive signals.

7. The method of claim 6, wherein:
    the two-dimensional representation of the radar receive signals further comprises a collection of range values; and
    compensating for the phase contribution of the radar receive signals in the slow-time dimension based on the range values of the two-dimensional representation of the radar receive signals comprises:
        compensating, for a portion of the collection of range values, the slow-time dimension of the two-dimensional representation based on the portion of the collection of range values of the two-dimensional representation.

8. The method of claim 1, wherein determining a range and a range rate associated with the object in the field of view based on the representation of the radar receive signals in the frequency domain comprises neglecting second order terms.

9. The method of claim 1, further comprising:
determining, based on a user input, one or more of the starting frequency of the initial chirp, the slope of the initial chirp, or the pulse repetition period of the initial chirp.

10. The method of claim 1, further comprising:
maintaining, in a memory in communication with the radar system, one or more of the starting frequency of the initial chirp; the slope of the initial chirp; or the pulse repetition period of the initial chirp.

11. The method of claim 1, wherein transmitting radar transmit signals representing the parameter defined stepped frequency waveform comprises:
obtaining, by a multiple-input multiple-output integrated circuit of the radar system and from a memory in communication with the radar system, the starting frequency of the initial chirp, the slope of the initial chirp, or the pulse repetition period of the initial chirp.

12. A system comprising:
a radar system having at least one processor configured to:
transmit, from the radar system, radar transmit signals representing a parameter defined stepped frequency waveform for a frame having at least two chirps including an initial chirp of the frame and a current chirp of the frame, the transmit of the radar transmit signals representing the parameter defined stepped frequency waveform including,
determining a pulse frequency for the current chirp relative to a pulse frequency of the initial chirp that cancels a coupling term in a frequency domain representation of radar receive signals received in response to the transmitting of the radar transmit signals by based on: i) a starting frequency of the initial chirp; ii) a slope of the initial chirp; iii) an index of the current chirp; and iv) a pulse repetition period of the initial chirp, and
outputting the current chirp of the parameter defined stepped frequency waveform having the pulse frequency that cancels the coupling term in the frequency domain representation of the radar receive signals;
receive, at the radar system, the radar receive signals representing the parameter defined stepped frequency waveform reflected off of an object in a field of view of the radar system;
perform a transformation of the radar receive signals to determine a representation of the radar receive signals in the frequency domain with the representation of the radar receive signals in the frequency domain having the coupling term cancelled therefrom;
determine a range and a range rate associated with the object in the field of view based on the representation of the radar receive signals in the frequency domain; and
output, to a radar tracker, the range and range rate associated with the object in the field of view to enable radar tracking of the object in the field of view.

13. The system of claim 12, wherein the parameter defined stepped frequency waveform for the frame further comprises a delay time of the current chirp from a beginning of the frame based on:
the starting frequency of the initial chirp;
the index of the current chirp; and
the pulse repetition period of the initial chirp.

14. The system of claim 13, wherein the processor is configured to perform a transformation of the radar receive signals to determine the representation of the radar receive signals in the frequency domain by:
performing a two-dimensional Fourier transform of the radar receive signals to generate a two-dimensional representation of the radar receive signals in the frequency domain, the two-dimensional representation including a fast-time dimension and a slow-time dimension.

15. The system of claim 14, wherein the processor is configured to determine the range and the range rate associated with the object in the field of view based on the representation of the radar receive signals in the frequency domain by:
determining a peak of the two-dimensional representation of the radar receive signals; and
determining the range and the range rate corresponding to the peak of the two-dimensional representation of the radar receive signals.

16. The system of claim 15, wherein the processor is configured to determine the range and the range rate corresponding to the peak of the two-dimensional representation of the radar receive signals by:
determining a fast-time frequency and a slow-time frequency associated with the peak of the two-dimensional representation of the radar receive signals; and
determining the range and the range rate corresponding to the fast-time frequency and the slow-time frequency associated with the peak of the two-dimensional representation.

17. The system of claim 14, wherein the processor is configured to perform the transformation of the radar receive signals to determine the representation of the radar receive signals in the frequency domain by:
compensating for a phase contribution of the radar receive signals in the slow-time dimension based on range values of the two-dimensional representation of the radar receive signals.

18. The system of claim 17, wherein:
the two-dimensional representation of the radar receive signals further comprises a collection of range values; and
the processor is configured to compensate for the phase contribution of the radar receive signals in the slow-time dimension based on the range values of the two-dimensional representation of the radar receive signals by compensating, for a portion of the collection of range values, the slow-time dimension of the two-dimensional representation based on the portion of the collection of range values of the two-dimensional representation.

19. The system of claim 12, wherein the processor is further configured to:
maintain, in a memory of the radar system, one or more of the starting frequency of the initial chirp; the slope of the initial chirp; or the pulse repetition period of the initial chirp.

20. The system of claim 12, further comprising a multi-input multiple-output integrated circuit configured to:
obtain, from a memory of the radar system, one or more of the starting frequency of the initial chirp, the slope of the initial chirp, or the pulse repetition period of the initial chirp; and
generate the parameter defined stepped frequency waveform based on the one or more of the starting frequency of the initial chirp, the slope of the initial chirp, or the pulse repetition period of the initial chirp obtained from the memory.

21. The method of claim 1, wherein the determining determines the pulse frequency for the current chirp relative to the pulse frequency of the initial chirp based on i) the starting frequency of the initial chirp; ii) the slope of the initial chirp; iii) the index of the current chirp; and iv) the pulse repetition period of the initial chirp such that the pulse repetition period decreases as the index of the current chirp increases.

22. The system of claim 12, wherein the at least one processor is configured to determine the pulse frequency for the current chirp relative to the pulse frequency of the initial chirp based on i) the starting frequency of the initial chirp; ii) the slope of the initial chirp; iii) the index of the current chirp; and iv) the pulse repetition period of the initial chirp such that the pulse repetition period decreases as the index of the current chirp increases.

* * * * *